(12) United States Patent
Renner et al.

(10) Patent No.: US 8,449,767 B2
(45) Date of Patent: May 28, 2013

(54) OIL RESERVOIR COMPRISING AN OIL FILTER

(75) Inventors: Uwe Renner, Lohne (DE); Christoph Lipp, Türingen (DE); Rolf Karlstedt, Saltsju-Buu (CH)

(73) Assignees: Robert Bosch GmbH, Stuttgart (DE); ZF Friedrichshafen AG, Friedrichshafen (DE)

( * ) Notice: Subject to any disclaimer, the term of this patent is extended or adjusted under 35 U.S.C. 154(b) by 465 days.

(21) Appl. No.: 12/741,483

(22) PCT Filed: Nov. 13, 2008

(86) PCT No.: PCT/DE2008/050032
§ 371 (c)(1),
(2), (4) Date: Jul. 21, 2010

(87) PCT Pub. No.: WO2009/062498

PCT Pub. Date: May 22, 2009

(65) Prior Publication Data
US 2012/0091047 A1    Apr. 19, 2012

(30) Foreign Application Priority Data
Nov. 15, 2007  (DE) .................. 10 2007 054 901

(51) Int. Cl.
*B01D 35/027*   (2006.01)
*B01D 35/147*   (2006.01)
(52) U.S. Cl.
USPC ............. 210/131; 210/167.04; 210/167.05; 210/172.2; 210/436; 210/443; 210/188; 210/247; 96/219; 96/213; 96/216

(58) Field of Classification Search
USPC ........... 210/131, 172.1, 172.2, 172.6, 167.02, 210/436, 443, 455, 188, 247, 512.1, 304–307, 210/167.04, 167.05; 96/204–216, 219, 220
See application file for complete search history.

(56) References Cited

U.S. PATENT DOCUMENTS

| 3,161,490 | A | * | 12/1964 | Dudek | .......................... 96/210 |
| 3,747,761 | A | | 7/1973 | Heinrich, Jr. | |
| 4,865,632 | A | | 9/1989 | Yano et al. | |
| 4,997,556 | A | | 3/1991 | Yano et al. | |

(Continued)

FOREIGN PATENT DOCUMENTS

DE   27 42 610 A1   3/1979
DE   195 39 759 A1   4/1997

(Continued)

OTHER PUBLICATIONS

Chinese Search Report, marked to follow on Information Disclosure Statement filed on Aug. 2, 2012.

*Primary Examiner* — Terry Cecil
(74) *Attorney, Agent, or Firm* — Davis & Bujold, PLLC

(57) ABSTRACT

An oil reservoir having an oil inlet fitting and at least one oil outlet fitting for connecting to a hydraulic system. The reservoir comprising a housing having a lower housing part and a reservoir cover which is connected to the lower housing part and includes an integrated oil filter. An oil filler neck, which can be closed by a cap, is configured on the housing cover. The reservoir housing is equipped with at least one guide element which is attached to at least one inside wall of the reservoir housing and forms a circular guidance track for the oil. This guidance track forces the oil flow in a circular manner, after entering the reservoir and passing through the oil filter but before exiting the oil reservoir, such that any air which may be present is separated from the oil and can exit the oil reservoir via an air outlet.

10 Claims, 2 Drawing Sheets

U.S. PATENT DOCUMENTS

| | | |
|---|---|---|
| 6,348,087 B1 | 2/2002 | Aslin |
| 6,475,380 B1 | 11/2002 | Fangmann et al. |
| 7,105,044 B2 | 9/2006 | Konishi et al. |
| 2006/0060986 A1 | 3/2006 | Kim et al. |
| 2006/0107837 A1 | 5/2006 | Showalter et al. |
| 2007/0017370 A1 | 1/2007 | Clausen et al. |

FOREIGN PATENT DOCUMENTS

| | | |
|---|---|---|
| DE | 103 23 068 A1 | 12/2003 |
| DE | 10 2004 015 960 A1 | 9/2005 |
| DE | 199 25 635 B4 | 11/2005 |
| DE | 10 2005 048 697 A1 | 4/2007 |
| EP | 0 342 308 A2 | 11/1989 |
| EP | 0 376 443 A2 | 7/1990 |
| EP | 1 669 119 A1 | 6/2006 |
| WO | 00/10682 A1 | 3/2000 |

* cited by examiner

OIL RESERVOIR COMPRISING AN OIL FILTER

This application is a National Stage completion of PCT/DE2008/050032 filed Nov. 13, 2008, which claims priority from German patent application serial no. 10 2007 054 901.8 filed Nov. 15, 2007.

FIELD OF THE INVENTION

The invention relates to an oil reservoir for a hydraulic system, comprising a reservoir housing and an oil filter integrated in the reservoir housing, wherein the reservoir housing is preferably made of plastic.

BACKGROUND OF THE INVENTION

Oil reservoirs are used, for example, in motor vehicle technology for storing the oil of a hydrostatic fan system circulated in a circuit through the reservoir for cooling the engine. According to the prior art, such oil reservoirs are frequently not equipped with an oil filter. However, since abraded particles or possible impurities must be filtered out of the oil in order to protect the components of the hydraulic system, an appropriate oil filter must be disposed in a different location of the system when using an oil reservoir without integrated oil filter.

However, oil reservoirs having an integrated oil filter that is disposed inside the oil reservoir are also known. Such an oil reservoir is described, for example, in DE 199 25 635 A1. In the case of the oil reservoir described in this document, the oil filter accommodated in the oil reservoir is further encapsulated in a separate filter housing inside the oil reservoir housing. Due to the special design, the oil filter is disposed completely beneath the oil level independently of the fill level otherwise present in the oil reservoir, so that the oil cannot pick up any air during filtration, which can impair the functionality of the cooling system and, as a result, may cause units in the motor vehicle to fail. Admittedly, an oil reservoir designed according to this document makes the separate arrangement of an oil filter in the hydraulic system outside of the oil reservoir expendable, and additionally effectively prevents impairments of the system due to air present in the oil. With respect to the necessary encapsulation of the oil filter inside the oil reservoir, however, the solution is comparatively complex.

Another possibility to avoid impairment of the cooling system due to air present in the oil in the form of air bubbles is to dispose guide devices in the oil reservoir for the directed oil guidance. Such guide devices lengthen the otherwise relatively short distance between the oil inlet fitting and the oil outlet fitting or fittings and promote a separation of air that may be present in the oil on this extended distance, wherein in addition the effectiveness of this measure is decisively determined by the geometry of the guide devices and the guidance track they set for the oil. In this respect, cyclone systems have been successfully applied for separating the air, such as those described in EP 1 669 119 A1 and U.S. Pat. No. 6,348,087 B1, for example. By way of such cyclone systems, the oil, together with any air bubbles that may be present therein, is caused to rotate on a circular track, and the air is thereby separated from the oil due to the developing centrifugal force and the different densities between the hydraulic fluid and air. While in this context in particular EP 1 669 119 A1 also relates to the configuration of an appropriate cyclone arrangement inside or as part of an oil reservoir, the oil reservoir according to the publication relates to a reservoir without an integrated oil filter. When used inside an oil reservoir, the solution known from the U.S. patent is also obviously not intended to be combined with an oil filter.

SUMMARY OF THE INVENTION

It is the object of the invention to provide an oil reservoir which comprises an oil filter and which has a simple design and yet prevents air bubbles from making their way into the circuit of a hydraulic system together with the oil taken in from the reservoir.

The oil reservoir for a hydraulic system proposed for achieving the object comprises a reservoir housing having a lower housing part and a reservoir cover, which is connected to the lower housing part in a bonded or form-locking manner, and an oil filter disposed in the reservoir housing. An oil inlet fitting and at least one oil outlet fitting are configured on the reservoir housing, which is preferably made of plastic, for connecting the oil reservoir to at least one oil circuit or a circuit of a hydraulic system, wherein the oil stored in the oil reservoir is suctioned out of the reservoir by way of an oil pump when the reservoir is incorporated in an appropriate hydraulic circuit. Furthermore, an oil filler neck, which can be closed by a cap, is provided on the oil reservoir.

According to the invention, the reservoir housing is furthermore equipped with at least one guide element, which is attached to at least one inside wall of the reservoir housing and which forms a circular guidance track for the oil. By passing this circular guidance track, the oil is forced to perform rotational movement after flowing through the oil filter, and before exiting the oil reservoir by way of the oil outlet fitting or fittings, so as to separate the air that may be present in the oil. Because of the resulting centrifugal force acting on the oil comprising the potentially trapped air, the air is separated from the oil and can exit the oil reservoir via an air outlet opening disposed in the wall of the reservoir cover or in a cap of the oil filler neck.

The oil reservoir according to the invention therefore comprises an integrated oil filter, however which does not require separate encapsulation because of the guidance track formed for the oil in the reservoir and the resulting ability to effectively separate air that may be present in the oil. In this way, a simple design for the oil reservoir is achieved, which at the same time serves as an oil filter and also takes into account the need for suppressing the entrance of air in the form of air bubbles present in the oil into the hydraulic circuit.

According to a preferred embodiment of the invention, the guide element is, or the guide elements are disposed around the oil filter. The guide element produces, or the guide elements produce a hollow-cylindrical space surrounding the preferably cylindrical oil filter. The inside walls of this hollow-cylindrical space form the circular guidance track for the oil, which in this case opens in the direction of the at least one oil outlet fitting. This embodiment is advantageously refined in that the circular guidance track is led around the oil filter in a spiral-shaped path in more than one full circulation. In this way, a long guiding track is produced and, with respect to separating the air, advantageous strong turbulence of the oil is achieved.

In a particularly advantageous embodiment of the oil reservoir according to the invention, the oil filter is equipped with a filter protection valve. This filter protection valve protects the oil filter from destruction by possibly occurring pressure peaks of the oil which enters the oil reservoir from the oil circuit by way of the oil inlet fitting and is supplied to the oil filter. For this purpose, when such pressure peaks occur, the filter protection valve opens a bypass by way of which part of the oil enters the guidance track without passing the oil filter and, by way of the guiding track, enters the oil outlet fitting or fittings. In order to protect the oil filter from destruction, it is acceptable that in rare cases when isolated pressure peaks occur a small part of the filter enters the circuit again without being filtered.

In keeping with a practical embodiment comprising a cylindrical reservoir housing, the oil inlet fitting and the at least one oil outlet fitting are configured on the reservoir bottom of the oil reservoir. The oil inlet fitting disposed in the center of the reservoir bottom opens directly into the oil filter, which is designed as a hollow cylinder, projects vertically upward from the inside of the reservoir bottom, and is closed at the top thereof. The oil outlet fitting is, or the oil outlet fittings are disposed laterally next to the oil filter and outside of the hollow-cylindrical space which surrounds the same and is formed by at least one guide element attached to the reservoir bottom. This embodiment can be further refined in that a baffle plate is disposed in the reservoir housing above the hollow-cylindrical space. This baffle plate prevents the oil, which has been forced to perform a rotational movement, from moving upward in the outer reservoir regions and a funnel-shaped vortex from forming in the oil filter, which would reduce the oil volume passing the filter. The lower housing part and the housing cover are preferably connected to each other by a welded joint, by means of which also the baffle plate extending horizontally between the lower housing part and the housing cover is attached to the reservoir housing.

In the above-described embodiment comprising the oil filter projecting vertically upward from the lower housing part and the oil inlet fitting opening into the same, a filter protection valve in accordance with a preferred refinement is implemented in that the oil filter is mounted in the oil reservoir in a spring-loaded manner. For this purpose, in a corresponding embodiment, by way of a tappet disposed on the top thereof, a projection configured on the tappet, and a coil spring resting on the projection, the oil filter is mounted in a spring-loaded manner on a bar disposed in the oil filler neck so as to form an abutment. In the event of excess pressure of the oil flowing into the filter, the oil filter is pushed upward due to the spring-loaded mounting thereof, so that part of the oil can flow into the oil reservoir beneath the oil filter, without being filtered, along the outside of the oil inlet fitting protruding into the oil filter.

A possible embodiment of the oil reservoir according to the invention, which is designed for incorporation in hydraulic circuits of a motor vehicle, comprises two oil outlet fittings and, at the same time, is part of two independent hydraulic circuits. Such an oil reservoir could possibly both be part of a hydrostatic fan circuit and part of a hydraulic steering system in a motor vehicle. Furthermore, an additional inlet fitting for the inlet of leakage oil, which is collected at the working units of a hydraulic system and recirculated into the oil reservoir, may be configured on the oil reservoir according to the invention.

BRIEF DESCRIPTION OF THE DRAWINGS

The invention will be illustrated and described in more detail based on an exemplary embodiment. The associated drawings show.

DETAILED DESCRIPTION OF THE PREFERRED EMBODIMENTS

Figure 1:
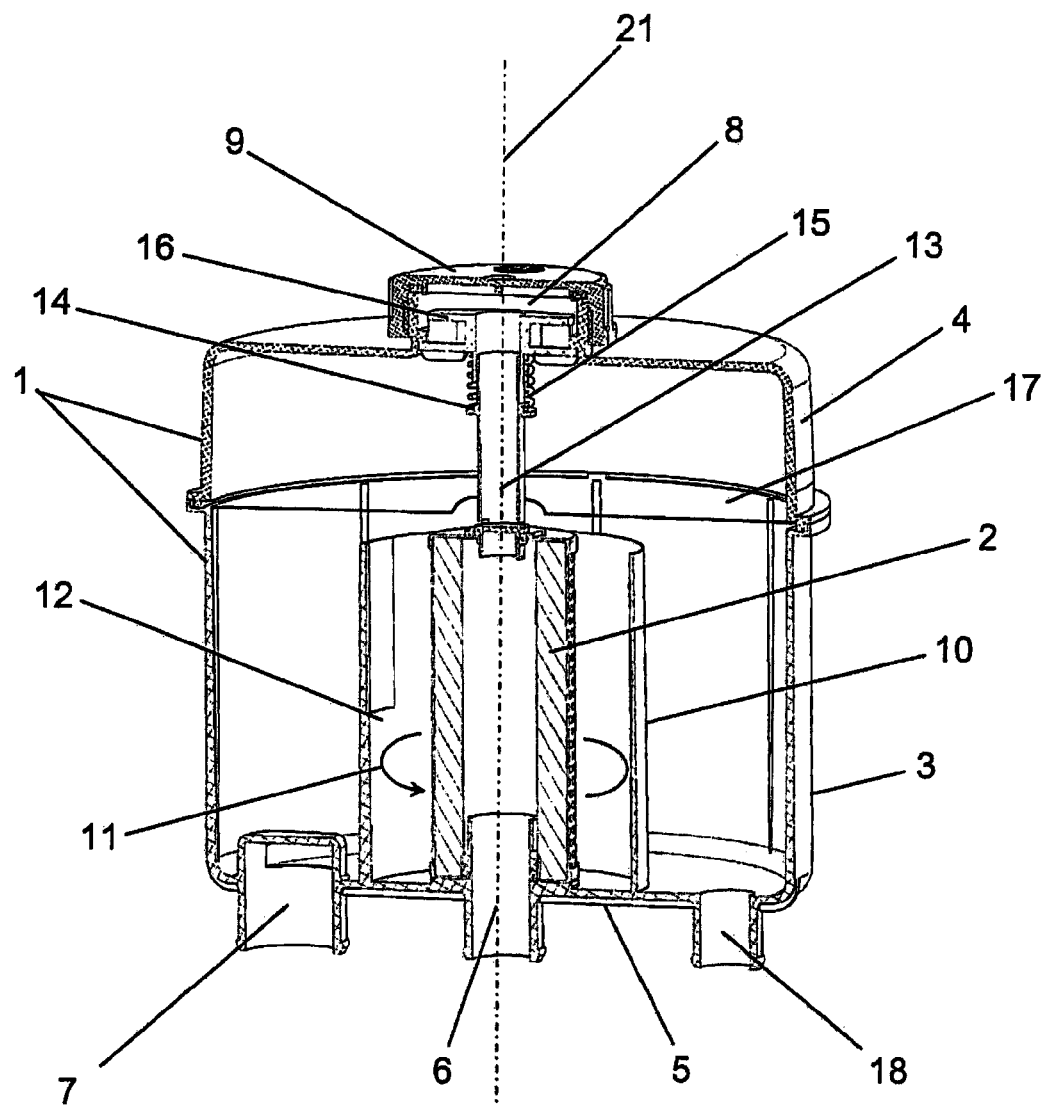
FIG. 1: a spatial representation of a possible embodiment of the oil reservoir according to the invention in an axial section.

FIG. 1 shows a possible embodiment of the oil reservoir according to the invention. The illustration is a spatial representation of the oil reservoir in an axial section, which is to say a representation having a section that is guided longitudinally through the reservoir or parallel to the longitudinal axis 21.

The oil reservoir substantially comprises a reservoir housing 1 and the oil filter 2 disposed therein, wherein the reservoir housing 1 is formed by a lower housing part 3 and a housing cover 4, which is connected to the lower housing part 3 by a welded joint. On the bottom 5 of the lower housing part, the reservoir 3 comprises fittings 6, 7, 18, these being an oil inlet fitting 6, an oil outlet fitting 7, and an additional inlet fitting 18 for leakage oil. The oil reservoir is connected to a hydraulic system, which is not shown in the figure, by way of the oil inlet fitting 6 and the oil outlet fitting 7, and thereby is part of an oil circuit. The hydraulic fluid recirculated from the hydraulic system enters the oil reservoir by way of the oil inlet fitting 6 and, after filtration thereof, is suctioned back out of the oil reservoir into the circuit via the oil outlet fitting 7 by a hydraulic pump (not shown).

As is apparent from the figure, the oil inlet fitting 6 opens directly into the hollow-cylindrical oil filter 2 sitting on the end of the oil inlet fitting 6. Abraded particles originating from the system and impurities are filtered out of the oil by the oil filter 2, the design of which is known from the prior art and which therefore will not be explained in detail, before the purified oil reaches the oil outlet fitting 7. According to the invention, disposed around the oil filter 2 is a guide element 10, by which oil exiting the oil filter 2 after filtration is guided on a circular guidance track 11 and forced to perform a rotational movement. The guide element 10 prevents the oil, including the possibly air bubbles trapped therein, from directly reaching the oil outlet fitting 7, and therefore the downstream hydraulic system. This already contributes to the possibility of separating air, which may be present in the oil, from the oil on the longer distance to the oil outlet fitting. Due to the special shape of the guide element 10, which forms a hollow-cylindrical space 12 around the oil filter 2, with oil entering this space after passing the oil filter 2 on the way thereof to the oil outlet fitting 7, the oil is caused to perform a rotational movement, as explained above. Due to the centrifugal force acting on the oil and the possibly present air, the air, which has a lower density than the oil, is separated as the oil/air mixture moves along the circular guiding track 11 formed by the guide element 10. The separated air can exit the oil reservoir by way of an air outlet opening, which is not visible in the representation, in the region of the oil filler neck 8 or the cap 9 closing the same.

As is further apparent from the figure, in the embodiment shown a horizontally extending baffle plate 17, which is welded to the edge of the oil reservoir together with the lower housing part 3 and the reservoir cover 4, is disposed between the lower housing part 3 and the reservoir cover 4. This baffle plate 17 prevents the oil performing a rotational movement from moving upward in the outer region of the oil reservoir and prevents a downwardly directed vortex from forming at the center thereof, that is, in the region of the oil filter 2. Such a vortex would be undesirable, because in this way the capacity of the oil filter would not be utilized properly.

In the illustrated embodiment of the oil reservoir according to the invention, the oil filter 2 is additionally equipped with a filter protection valve 13, 14, 15. This valve is implemented in that the oil filter 2 is supported on a bar 16 disposed in the oil filler neck 8 by way of the tappet 13 disposed on the closed top thereof and a spring 15 resting on a projection 14 of this tappet. If oil reaches the oil filter 2 by way of the oil inlet fitting 6 at a pressure that is too high, the spring-mounted oil filter 2 is pushed upward against the force of the spring 15 such that, beneath the oil filter, a kind of bypass is opened for the oil, through which part of the oil can flow along the outside of the oil inlet fitting 6, beneath the oil filter 2, into the oil reservoir. In this way, the oil filter 2 is protected from destruction by temporary excess pressure. If the oil reservoir is incorporated in a hydraulic system, for example, such excess pressure can develop in the oil when starting up a unit which is initially cold, because the oil is still comparatively solid or viscous. The further inlet fitting 18 disposed additionally on the reservoir housing 1 is used to recirculate leakage oil from units of the hydraulic system into the oil reservoir.

Figure 2:
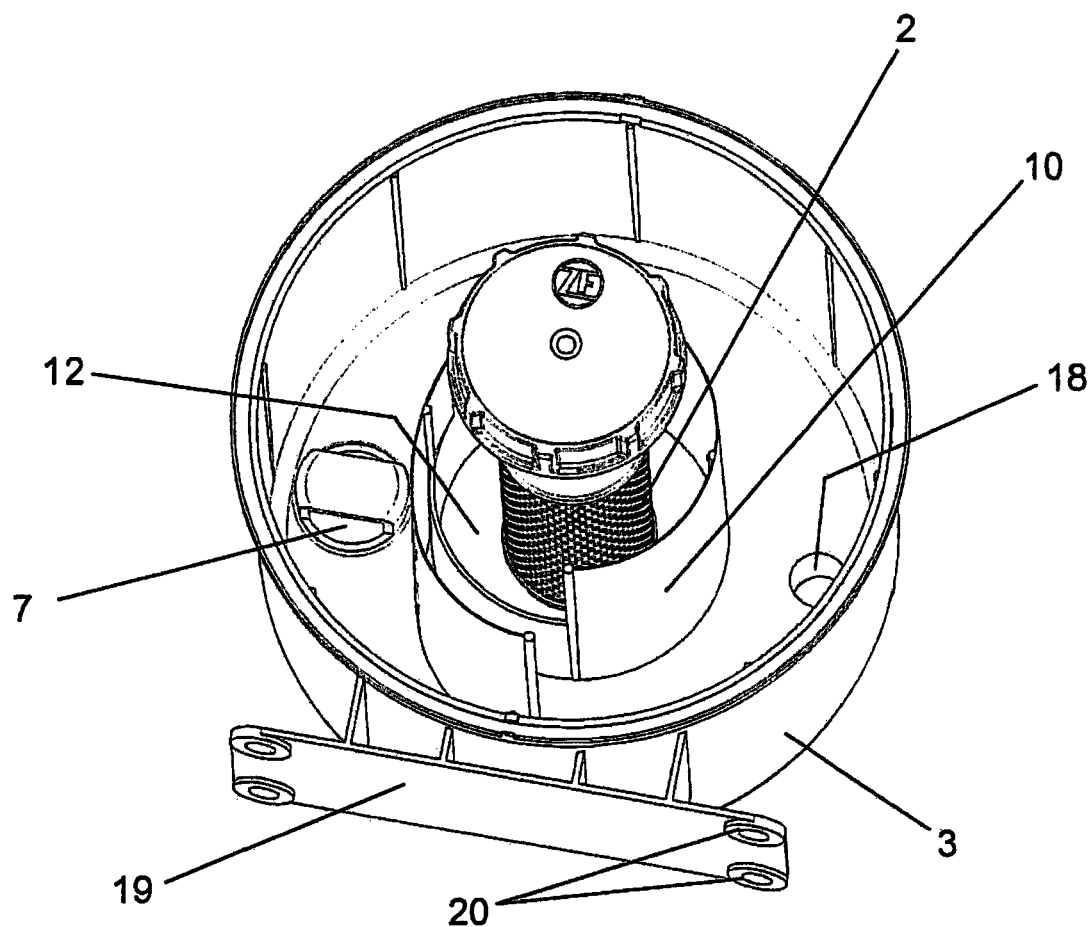
FIG. 2: a top view of the oil reservoir according to FIG. 1 without the reservoir cover.

FIG. 2 shows the oil reservoir of FIG. 1 again in a top view, with the reservoir cover 4 and the baffle plate 17 being removed. In this illustration, the hollow-cylindrical space 12 formed by the guide element 10 and the path of the guiding track 11 for the oil are particularly visible. It is apparent that the oil is led around the oil filter 2 in a circular motion, wherein the oil is moved around the oil filter 2 in more than one circulation due to the spiral-shaped path of the guiding track 11. The guiding track 11, as is apparent, ends in the vicinity of the oil outlet fitting 7. The oil, from which the air has been removed due to the centrifugal force, is finally recirculated to the hydraulic system by way of the oil outlet fitting 7. On the outside wall, the oil reservoir comprises an attachment plate 19, by which it can be attached in the engine compartment of a motor vehicle using bores 20 incorporated therein.

LIST OF REFERENCE NUMERALS

1 Reservoir housing
2 Oil filter
3 Lower housing part
4 Housing cover
5 Housing bottom
6 Oil inlet fitting
7 Oil outlet fitting
8 Oil filler neck
9 Cap
10 Guide element
11 Guidance track
12 Hollow-cylindrical space
13 Tappet
14 Projection
15 Spring
16 Bar
17 Baffle plate
18 Inlet fitting
19 Attachment plate
20 Bore
21 Longitudinal axis

The invention claimed is:

1. An oil reservoir for a hydraulic system comprising:
a substantially cylindrical reservoir housing (1) having a lower housing part (3) and a housing cover (4) which is connected to the lower housing part (3) by one of a bonded or a form-locking manner,
a substantially cylindrical oil filter (2) being disposed in the reservoir housing (1),
the reservoir housing (1) having an oil inlet fitting (6) and at least one oil outlet fitting (7) for connecting the oil reservoir to at least one circuit of the hydraulic system,
an oil filler neck (8), closed by a cap (9), being configured on the reservoir housing (1),
wherein at least one spiraling guide element (10) being disposed in the reservoir housing (1) on at least one inside wall of the reservoir housing (1),
the guide element is concentrically arranged within the reservoir housing, the oil filter is concentrically arranged within the guide element and the oil inlet fitting is concentrically arranged within the oil filter such that oil is initially directed from the inlet radially outward through the oil filter, the guide element forming a circular guidance track (11) for the oil which forces the oil to perform a rotational movement, after passing through the oil filter (2) but before exiting the oil reservoir by way of the at least one oil outlet fitting (7), so as to separate air present within the oil, and the separated air exiting the oil reservoir via an air outlet opening disposed in one of a wall of the reservoir cover (4) or the cap (9) of the oil filler neck (8).

2. The oil reservoir according to claim 1, wherein the oil filter (2) is equipped with a filter protection valve (13, 14, 15) by which the oil filter (2) is protected from destruction due to pressure peak of the oil entering the oil reservoir from the oil circuit by way of the oil inlet fitting (6), and when such pressure peaks occur, the filter protection valve (13, 14, 15) opens a bypass by which part of the oil reaches the at least one oil outlet fitting (7), via the guidance track (11), without passing through the oil filter (2).

3. The oil reservoir according to any claim 1, wherein the reservoir comprises two oil outlet fittings (7) and is part of two separate hydraulic circuits and is incorporated into a hydraulic circuit of a motor vehicle.

4. The oil reservoir according to claim 1, wherein the oil reservoir further comprises an inlet fitting (18), for inlet of leakage oil for collection of at least one working unit of a hydraulic system and recirculated into the oil reservoir.

5. An oil reservoir for a hydraulic system comprising:
a reservoir housing (1) having a lower housing part (3) and a housing cover (4) which is connected to the lower housing part (3) by one of a bonded or a form-locking manner,
an oil filter (2) being disposed in the reservoir housing (1),
the reservoir housing (1) having an oil inlet fitting (6) and at least one oil outlet fitting (7) for connecting the oil reservoir to at least one circuit of the hydraulic system,
an oil filler neck (8), closed by a cap (9), being configured on the reservoir housing (1),
at least one guide element (10) being disposed in the reservoir housing (1) on at least one inside wall of the reservoir housing (1),
the guide element forming a circular guidance track (11) for the oil which forces the oil to perform a rotational movement, after passing through the oil filter (2) but before exiting the oil reservoir by way of the at least one oil outlet fitting (7), so as to separate air present within the oil, and the separated air exiting the oil reservoir via an air outlet opening disposed in one of a wall of the reservoir cover (4) or the cap (9) of the oil filler neck (8),
the at least one guide element (10) is disposed around the oil filter (2), and
the at least one guide element (10) forms a hollow-cylindrical space (12) which surrounds the cylindrical oil filter (2), and an inwardly facing wall of which forms the circular guidance track (11) which opens in direction of the at least one oil outlet fitting (7).

6. The oil reservoir according to claim 5, wherein the circular guidance track (11) extends around the oil filter (2) in a spiral-shaped path for more than one full rotation.

7. The oil reservoir according to claim 5, wherein the reservoir housing (1) is cylindrical, the oil inlet fitting (6) and the at least one oil outlet fitting (7) are located on a bottom (5) of the oil reservoir, the oil inlet fitting (6), which is disposed at a center of the bottom (5) of the oil reservoir, the oil inlet fitting (6) opens directly into the oil filter (2), which is designed as a hollow cylinder, projects vertically upward from inside of the reservoir bottom (5) and is closed at the top thereof, and the at least one oil outlet fitting (7) is disposed laterally adjacent the oil filter (2) and outside of the hollow-cylindrical space (12) surrounding the same and formed by the at least one guide element (10) that is attached to the bottom (5) of the oil reservoir.

8. The oil reservoir according to claim 7, wherein a baffle plate (17) is disposed above the hollow-cylindrical space (12).

9. The oil reservoir according to claim 8, wherein the lower housing part (3) and the housing cover (4) are connected to each other by a welded joint, and the baffle plate (17) extends horizontally between the lower housing part (3) and the housing cover (4) and is attached to the reservoir housing (1).

10. The oil reservoir according to claim 7, wherein a filter protection valve (13, 14, 15) is implemented by a spring-loaded mounting of the oil filter (2) by way of a tappet (13) disposed on a top thereof, a projection (14) is configured on the tappet (13), and a coil spring (15) resting on the projection, the filter is mounted in a spring-loaded manner on a bar (16) disposed on the oil filler neck (8) so as to form an abutment, and, if the oil flowing into the oil filter (2) has excess pressure, the oil filter (2) is pushed upward due to the spring-loaded mounting such that part of the oil flows into the oil reservoir beneath the oil filter (2), without being filtered, along an outside of the oil inlet fitting (6) projecting into the oil filter (2).

* * * * *